United States Patent [19]
Tsukui

[11] Patent Number: 5,589,880
[45] Date of Patent: Dec. 31, 1996

[54] TELEVISION CAMERA USING TWO IMAGE PICKUP DEVICES WITH DIFFERENT SENSITIVITY

[75] Inventor: Akimi Tsukui, Higashikurume, Japan

[73] Assignee: Hitachi Denshi Kabushiki Kaisha, Tokyo, Japan

[21] Appl. No.: 377,708

[22] Filed: Jan. 25, 1995

[30] Foreign Application Priority Data

Jan. 25, 1994 [JP] Japan .................................. 6-006202

[51] Int. Cl.⁶ .................................................. H04N 5/235
[52] U.S. Cl. ........................... 348/229; 348/296; 348/363
[58] Field of Search ................................ 348/222, 229, 348/230, 262, 296, 362, 363, 364

[56] References Cited

U.S. PATENT DOCUMENTS

| | | | |
|---|---|---|---|
| 5,144,442 | 9/1992 | Ginosar et al. | 348/222 |
| 5,168,532 | 12/1992 | Seppi et al. | 348/230 |
| 5,309,243 | 5/1994 | Tsai | 348/229 |
| 5,396,288 | 3/1995 | Tsugita et al. | 348/229 |
| 5,420,635 | 5/1995 | Konishi et al. | 348/229 |
| 5,455,621 | 10/1995 | Morimura | 348/230 |

FOREIGN PATENT DOCUMENTS

| | | | |
|---|---|---|---|
| 04354277 | 12/1992 | Japan | H04N 5/238 |
| 05064070 | 12/1993 | Japan | H04N 5/235 |

*Primary Examiner*—Wendy Garber
*Attorney, Agent, or Firm*—Antonelli, Terry, Stout & Kraus

[57] ABSTRACT

An optical image of an object from the lens system is split in a predetermined ratio of light quantity and applied to first and second image pickup devices as first and second optical images. The dynamic range of a camera utilizing the first and second image pickup devices is increased and a signal from a first one of the first and second image pickup devices is utilized to control an iris and a signal from the second on of the first and second image pickup devices is utilized to control a charge storage time.

17 Claims, 9 Drawing Sheets

TELEVISION CAMERA USING TWO IMAGE PICKUP DEVICES WITH DIFFERENT SENSITIVITY

BACKGROUND OF THE INVENTION

1. Field of the Invention

The present invention relates to a television camera using two image pickup devices with different sensitivity and, more particularly, is directed to a television camera suitable for imaging or image-picking up an object having a large contrast.

2. Description of the Related Arts

One of the basic functions of the television camera is to reproduce an object faithfully which has been picked up as an image. The object imaged by the television camera, however, is of various types, and has various brightness (luminances). That is, the object is composed of components with complicated brightness and components which vary in brightness. The conventional television cameras have the technique developed to faithfully reproduce an object image even when the object is composed of components with complicated brightness and different brightness.

A block diagram of a television camera according to the related art is shown in FIG. 1. The television camera shown in FIG. 1 includes an image pickup lens system 1, an image pickup device such as CCD 3, a pre-amplifier 5, a video signal processing circuit 15, a video signal output terminal 16, a lens iris control circuit 6, an iris structure 17 in the image pickup lens system 1 and a drive circuit 18 for the image pickup device 3. FIG. 2 is a photoelectric conversion characteristic diagram showing the characteristic of the signal output versus the incident light quantity of the image pickup device 3.

The operation of this television camera will be explained. The light entering from an object not shown is applied to the image pickup device 3 through the image pickup lens system 1, and after photoelectric conversion at the image pickup device 3, provides a video signal which is applied to the pre-amplifier 5.

The video signal is amplified up to a predetermined level at the pre-amplifier 5 and applied to the video signal processing circuit 15 and the lens iris control circuit 6.

The video signal applied to the video signal processing circuit 15 is subjected to signal processing such as the addition of a sync signal from a sync signal generator not shown, and is output from the video signal output terminal 16 as a composite video signal.

The lens iris control circuit 6, on the other hand, detects the average value or the peak value of the video signal input from the pre-amplifier 5, and compares the detected the average or peak value value with a reference value to extract the change in the average value or the change in the peak value, as the case may be. In accordance with the change in the average value or the peak value of the video signal thus extracted, the aperture state of the iris structure 17 in the lens system 1 is controlled in such a manner as to maintain a predetermined value of the output video signal level of the pre-amplifier 5, thereby controlling the quantity of the light entering the image pickup device 3.

Explanation will be made about the photoelectric conversion characteristic diagram showing the characteristic of the signal output versus the incident light quantity of the image pickup device shown in FIG. 2. As shown in FIG. 2, the image pickup device outputs a signal which increases substantially in proportion to the incident light quantity when the incident light quantity is below a certain level Is. When the incident light quantity is equal to or above the certain level Is, however, the signal output reaches a saturated level where the signal output does not substantially increase with the increase in the incident light quantity. This level Is at which the output signal of the image pickup device saturates will hereinafter be called as a saturation or saturated incident light quantity.

When the quantity of light entering the image pickup device from an object exceeds the saturated incident light quantity, the output signal level of the image pickup device is saturated at an image portion of the object an incident light quantity thereof exceeds the saturated incident light quantity. When this signal output is viewed on a video monitor, the image portion of the object whose incident light quantity exceeds the saturated quantity assumes a monotonically white image lacking variations and cannot be viewed as an image proportional to the incident light quantity.

The television camera, which uses an image pickup device having the characteristics described above, includes a lens iris control circuit for controlling the aperture state of the lens iris structure in such a manner that the incident light quantity entering the image pickup device from a bright object to be imaged becomes proper value. In this manner, the quantity of the light entering the image pickup device is maintained below a saturated incident light quantity level to prevent a bright portion of the object from forming a monotonically white image without any variations.

In the conventional television cameras, however, in spite of the fact that the aperture state of the iris structure in the lens system is controlled to control the incident light quantity entering the image pickup device, the incident light entering the image pickup device cannot be controlled so as to be not larger than the saturated incident light quantity Is in the case where an object has a very bright area when the object has a large contrast or the object is imaged under reverse light. As a result, the signal output is saturated, and the object as viewed on an image monitor is monotonically white without any variations. In addition, the lens iris control circuit, which is influenced by the video signal in the high brightness area, cannot properly control the incident light quantity of the object to be imaged, with the result that the object to be imaged is blackened.

In other words, when an attempt is made to obtain an image of an object of high illuminance at a proper level, an object of low illuminance becomes dark in the phenomenon of what is called the solid blackening. An attempt to produce an image of an object of low luminosity at the proper level, on the other hand, results in a high-illuminance object being whitened monotonically in a phenomenon of what is called the solid whitening.

FIGS. 3 and 4a are diagrams showing other example configuration of the television camera suggested considering the disadvantages of the prior art described above. The television camera configured this way is disclosed, for example, in JP-A-4-354277 (reference (1)).

In FIG. 3, reference numeral 1 designates a lens, 3 a CCD, 5 a pre-amplifier for amplifying the output of the CCD 3, 24 a CCD control circuit for controlling the storage time, i.e., the shutter speed of the CCD 3, 7 an analog-to-digital (hereinafter referred to as A/D) converter, 26 a high-speed image memory for writing and reading the digital video signal obtained upon the high shutter speed operation of the CCD 3 with a shorter charge storage time, and 27 a low-speed image memory for writing and reading the digital video signal obtained upon a low shutter speed operation of the CCD 3 with a longer charge storage time. Reference numeral 28 designates a high brightness segmented area detection circuit for receiving the digital video signal upon the low shutter speed operation to divided an image of the digital video signal corresponding to one screen of an object image picked-up by the CCD 3 into plural segmented areas and for detecting a high-brightness segmented area such as a back-light area among the plurality of segmented areas, 29 a signal switcher for selecting a digital video signal upon the low or high shutter speed operation, 14 a digital-to-analog (hereinafter referred to as D/A) converter, 22 an automatic gain control (AGC) amplifier, 15 a signal processing circuit for processing the video signal into a composite video signal, 16 a composite video signal output terminal, 6 an iris control circuit, and 17 an iris.

In this configuration, the CCD 3 is controlled by the CCD control circuit 24 to be alternately operated in high- and low-speed shutter modes for each field. As a result, the CCD 3 performs the high-speed operation in even-number fields to output a video signal not saturated even for the high-brightness portion of the object to the high-speed image memory 26. In odd-number fields, on the other hand, the CCD 3 performs the low-speed shutter operation, so that the video signal saturated for the high-brightness portion of the object is output to the low-speed image memory 27. The high-brightness segmented area detection circuit 28 divides an image of the digital video signal corresponding to one screen into a number N to the horizontal scanning direction and a number M to the vertical scanning direction (both N and M are integers of 2 or more). In this way, each image corresponding to one screen is composed of areas segmented into a number N×M of segmented areas. With each segmented area thus segmented, the average value of the digital video signal (the output of the low-speed image memory 27) upon the low-speed shutter operation is determined thereby to detect whether each segmented area is a high-brightness segmented area or not. In the case where it is decided that a segmented area is a high-brightness segmented area, the signal switcher 29 selects the output of the high-speed image memory 26 (the digital video signal for high-speed shutter operation) for the entire area of the high-brightness segmented area. In the case where decision is that a segmented area is not a high-brightness segmented area, on the other hand, the signal switcher 29 selects the output of the low-speed image memory 27 (the digital video signal for low-speed shutter operation).

FIG. 4B is a model diagram showing an image of an object corresponding to one screen 80 imaged by the CCD 3. As shown in FIG. 4B, an image of the screen 80 is segmented into nine areas 80A to 80I, for example. An image of the object, for example, is assumed to include a high-brightness area 81 and a low-brightness area 82. As a result, in this case, since the segmented area 80E is entirely covered by the high-brightness area 81 and almost of the segmented area 80E is covered by the high-brightness area 81, the segmented areas 80E and 80F, for example, are determined to be a high-brightness segmented area, so that the switcher 29 selects the digital video signal for the high-speed shutter operation supplied from the image memory 26 as the digital video signal for these segmented areas 80E and 80F. For the other segmented areas, decision is made to be not a high-brightness area and hence the digital video signal of the low-speed shutter operation supplied from the image memory 27 is selected as the digital video signal for these other segmented areas.

FIG. 4A is a circuit diagram showing the essential parts of a modification of the circuit of FIG. 3. The essential parts shown in FIG. 4 include a high-speed shutter operation control circuit 25A for controlling the control circuit 24 which in turn controls the shutter speed of the CCD 3 upon a high-speed shutter operation, and a low-speed shutter operation control circuit 25B for controlling the control circuit 24 to control the shutter speed of the CCD 3 upon a low-speed shutter operation.

The high-speed shutter operation control circuit 25A operates in a manner that an image of the output video signal corresponding to one screen from the pre-amplifier 5 is divided into three sections to the horizontal and vertical directions to obtaine nine segmented areas, for example. The average value of the digital video signal is determined for each segmented area, and the shutter speed of the CCD upon the high-speed shutter operation is controlled in such a manner that the average value of the digital video signal for a segmented area with the highest average value attains 80% of the full scale of the output voltage of the CCD, for example. The low-speed shutter control circuit 25B, on the other hand, operates in a manner that an image of the output video signal corresponding to one screen from the pre-amplifier 5 is also divided into nine segmented areas and the shutter speed of the CCD upon the low-speed shutter speed operation is controlled in a manner that the average value of the digital video signal represents 30% of the full scale of the output voltage of the CCD, for example, for the segmented area with the lowest average value of the digital video signal.

In this way, the proper exposure characteristics of the CCD are obtained even at the time of imaging of an object having a large contrast or in back light, thereby preventing the white solidification or the black solidification of the video signal.

More specifically, in the configuration of FIG. 4A, as shown in FIG. 4B, an image of the output video signal corresponding to one screen 80 of the object is segmented into nine segmented areas 80A to 80I, and it is decided whether each segmented area thus segmented is a high brightness segmented area or not on the basis of the average value of the video signal for the segmented area. The shutter speed, i.e., the charge storage time, of the CCD upon the high-speed shutter operation, is thus controlled in such a manner that the video signal for the segmented area with the highest average value assumes the proper level. Also, the shutter speed upon the low-speed shutter operation is controlled in such a way that the video signal for the segmented area with the lowest average value represents the proper level.

In FIG. 4B, the segmented areas 80E and 80F are assumed to be a high brightness segmented area, and the other segmented areas to be not high brightness segmented areas. Further the segmented area 80E has the highest average value of the video signal and the segmented area 80G has the lowest average value thereof.

The configuration of still another example of the television camera suggested taking the above-mentioned disadvantages of the prior art into consideration is shown in FIG. 5. The television camera configured this way is disclosed, for example, in JP-A-5-64070 (reference (2)).

The configuration shown in FIG. 5 includes an imaging lens 1, a iris 17, a beam splitter 2 providing a spectrometer, two CCDs 3, 4, pre-amplifiers 5a, 5b, a white level compression pre-knee circuit 30, an automatic gain control amplifier (AGC) 31, an exposure control circuit 32, an amplifier 39, delay circuits 36, 37, a low-pass filter (LPF) 33, a comparator 34, a pulse-width detection circuit 35, a multiplexer 38 and a signal processing circuit 15. The optical image of the object is divided in its light intensity or quantity by the beam splitter 2 to obtain two optical images, which are then focused on the two CCDs 3, 4. The beam splitter 2 splits the light quantity of the optical image of the object from the lens 1 into the ratio of five to one and applies the two optical images to the CCDs 3 and 4 respectively. The output video signal (the output of the amplifier 5*a*) of the CCD 3, to which the optical image with a larger quantity of incident light is applicated, is used for exposure control by the exposure control circuit 32 on the one hand and subjected to the knee-processing by the pre-knee circuit 30 on the other hand. Further, the output video signal of the amplifier 5*a* is applied to the comparator 34 through the LPF to thereby be compared with a threshold voltage $V_{TH}$. When the level of the output video signal is higher than the threshold voltage $V_{TH}$, a signal is applied from the pulse-width detection circuit 35 to the multiplexer 38, which in turn selects and delivers the output of the delay circuit 37 (the output video signal of the CCD 4 having a smaller light quantity) instead of the output of the delay circuit 36. In this configuration, in the case where the brightness peak value of the video signal output from the CCD 4 is 40% or more of the white level (in other words, in the case where the brightness of the bright area is at least twice that of the dark area), the fitting synthesis of the image is selected, while the knee processing is selected when the brightness peak value is less than 40% of the white level. In the fitting synthesis processing, the video signal for a relatively bright area of an image represented by the video signal obtained from the CCD 3 is replaced by the video signal for a corresponding area of the image represented by the video signal obtained from the CCD 4. In the knee processing, the output video signal of the CCD 3 is compressed in its high-brightness area.

In this way, the video signal with proper image is obtained regardless of the magnitude of the brightness difference between the bright and dark areas.

SUMMARY OF THE INVENTION

In reference (1) described above, the single CCD 3 is alternately switched between low-speed and high-speed shutter operations for every field. For example, the high-speed shutter operation is performed for even-numbered fields, and the low-speed shutter operation for odd-numbered fields. The video signal upon the high-speed and low-speed shutter operations are stored in a high-speed image memory 26 and a low-speed image memory 27, respectively. As a result, only the video signal for even-numbered fields is stored in the high-speed image memory 26, and only the video signal for odd-numbered fields in the low-speed image memory 27. Also, a high-brightness segmented area detection circuit 28 determines, as to each of the segmented areas 80A to 80I, whether the segmented area is a high brightness segmented area or not based on the average level of the digital video signal (the output of the low-speed image memory 27) derived upon low-speed shutter operation for the segmented area. When a segmented area is decided to be a high-brightness segmented area, the signal switcher 29 selects the output of the high-speed image memory 26 (the digital video signal for high-speed shutter operation) for the entire area of the segmented area. In the case where decision is that the segmented area is not a high brightness segmented area, on the other hand, the output of the low-speed image memory 27 (the digital video signal for low-speed shutter operation) is selected for the entire area of the segmented area by the signal switcher 29. As a result, in FIG. 4B, for example, an image is formed only with the video signal of an even-numbered field in the segmented areas 80E and 80F determined to be of high-brightness segmented areas, while an image is formed only with the video signal of an odd-numbered field for the remaining segmented areas determined to be not a high brightness segmented area. In this way, while an image of each segmented area is intrinsically to be formed with a video signal of both odd-number and even-numbered fields, an image of each segmented area is formed only with one of these two types of fields. Therefore, the vertical resolution of the image obtained is one half that of the image which otherwise formed by both the odd and even-numbered fields.

As described above, the high-brightness segmented area detection circuit 28 detects whether each segmented area is a high brightness segmented area or not by determining the average level of the digital video signal for the segmented area derived upon low-speed shutter operation (the output of the low-speed image memory 27). As a consequence, in FIG. 4B, with respect to the segmented areas 80E and 80F which are determined to be high brightness segmented areas and for which the output of the high-speed image memory 26 is selected, the high-brightness area or portion 81 within these segmented areas is represented by an image of a video signal of the proper level not saturated. The low-brightness area or portion 82 in the segmented area 80F, however, is solidly blackened since a video signal of the area 82 becomes lower in level due to the selection of the output of the image memory 26. In similar fashion, for each of the other segmented areas which is determined to be not a high brightness segmented area and for which the output of the low-speed image memory 27 is selected, on the other hand, the low-brightness portion 82 of, for example, the segmented area 80B is produced by a video signal of the proper level. The high-brightness portion 81 of the segmented area 80B, however, represents a video signal of a saturated level and is solidly whitened. In other words, for the entire area of each segmented area, selection is uniquely made between the output of the high-speed image memory 26 which will be a proper lever for a high-brightness portion of the video signal and the output of the low-speed image memory 27 which will be a proper level for a low-brightness portion of the video signal. Accordingly, the segmented areas where a low-brightness portion and a high-brightness portion coexist are solidly blackened or whitened respectively like the prior art.

This problem may be eliminated by increasing the number of segmented areas of an image corresponding to one screen. In this case, however, when a segmented area includes portion of very high brightness (or very low brightness), even if the position is very small, the image for the small portion of the segmented area is likely to be solidly whitened (or blackened). In this way, the image for an object of a high contrast having a portion of a very high (or low) brightness becomes solidly whitened or blackened.

With the above-mentioned reference (2), on the other hand, the output video signals of the two CCDs, in which two optical images whose light quantity is split in the ratio of 5 to 1 by a beam splitter are entered, are selectively switched and output. However, this split ratio of the light quantity is constant, and therefore brightness level of an image of the video signal of the object does not become proper one in the entire area thereof when the object has a very large brightness difference, thereby appearing a solid whitened or blackened portion in the image of the object.

Accordingly, an object of the present invention is to provide a television camera which is capable of obviating the above-mentioned problems of the related arts.

Another object of the present invention is to provide a television camera in which even when an object having has a portion of very high brightness in the case of imaging the object having a large contrast or imaging in back light, a proper video signal high in resolution and in color reproducibility is produced without being solidly whitened or blackened due to the ability attached to arbitrarily enlarge the dynamic range against the incident light quantity limited by the characteristics of the image pickup devices.

According to one aspect of the invention, there is provided a television camera which includes a lens system having a iris structure for receiving the incident light from an object, a spectrometer for dispersing an optical image of the object from the lens system and producing first and second optical images, the spectrometer splitting the light quantity of the original optical image of the object in a predetermined ratio and assigning the respective portions of the light quantity between the first and second optical images, first and second image pickup devices for forming first and second optical images from the spectrometer and converting the first and second optical images thus formed into a video signal, first and second amplifiers for amplifying the video signals from the first and second image pickup devices, a high-brightness signal (area) detection circuit supplied with the video signal from the first amplifier for producing a detection signal indicating a high-brightness signal (area) upon detection that the input video signal is a high-brightness signal (area) higher than a predetermined level lower than the saturated output signal level of the first image pickup device, a video signal switcher for selecting and producing one of the video signals from the first and second amplifiers in accordance with the detection signal, a signal processing circuit for converting the video signal from the video signal switcher into a composite video signal and producing the composite video signal as an output composite video signal of the television camera, a iris control circuit for controlling the iris structure of the lens system in accordance with the video signal from the first amplifier, a high-brightness video signal extraction circuit for gating the video signal from the second amplifier in accordance with the detection signal and extracting a video signal (or a portion of a video signal) corresponding to the high-brightness signal (area), and an image pickup device control circuit for controlling the charge storage time of the second image pickup device in accordance with the level of the video signal extracted by the high-brightness video signal extraction circuit.

Preferably, the video signal switcher selects and produces the video signal from the second amplifier during the period when the detection signal indicates that the video signal from the first amplifier is a high-brightness signal (area).

In this configuration, in response to a fact that the video signal from the first image pickup device represents a high-brightness area, the output video signal of the second image pickup device corresponding to the high-brightness area of the output video signal of the first image pickup device is extracted, and the charges storage time (that is, sensitivity) of the second image pickup device is controlled in accordance with the brightness of the video signal thus extracted. Further, the video signal from the second image pickup device is selected as a television camera output during the period when the video signal represents a high-brightness area. The second image pickup device, therefore, can output a video signal corresponding to the incident light quantity without being saturated even for a high-brightness area of an image of an object, with the result that the solid whitening or solid blackening can be prevented even for an object having a very large contrast, while at the same time achieving good color reproducibility.

More specifically, this invention is different from the reference (1) described above in which a single CCD is operated alternatly between low-speed and high-speed shutter operations for every field, an image of the video signal corresponding to one screen is split into a plurality of segmented areas, the average value of the video signal upon low-speed shutter operation is used to decide whether or not each segmented area is a high brightness area, and on the basis of the decision, the image of the entire area of each segmented area is uniquely composed of the video signal upon the high-speed shutter operation (even-numbered field) or the video signal upon the low-speed shutter operation (odd-numbered field). In other words, according to the present invention, one of two video signals from two image pickup devices, each producing a video signal of odd- and even-numbered fields, is selected in accordance with a detection signal indicating that the video signal from a image pickup device represents a high-brightness video signal area. As a result, video signals of the entire image area corresponding to one screen are composed of video signals of even- and odd-numbered fields, and therefore the vertical resolution of the image is not deteriorated.

Also, this invention is different from the reference (1) described above in which an image corresponding to one screen is split into a plurality of segmented areas, the average value of the video signal for low-speed shutter operation for each segmented area is used to decide whether the segmented area is a high brightness segmented area or not, and the image of the entire area of each segmented area is uniquely composed of only one of the video signals derived upon high-speed shutter operation or low-speed shutter operation. In other words, according to this invention, one of the video signals from two image pickup devices is selected in accordance with a detection signal indicating that the video signal of an image pickup device represents a high-brightness video signal area. As a result, the video signal with a proper brightness level is attained for all the image areas correspond to one screen in accordance with the level of the video signal from the image pickup devices. Therefore, no area is solidly blackened or whitened unlike in reference (1), and good color reproducibility is obtained.

Preferably, the spectrometer assigns the light quantity of the optical image of an object from the lens system to the second and first optical images in a predetermined ratio ranging from 1:2 to 1:9.

As a consequence, the second image pickup device is capable of producing a non-saturated video signal corresponding to the brightness of a higher-brightness portion of an object, thereby broadening the dynamic range of the television camera.

Preferably, the image pickup device control circuit controls the charge storage time of the second image pickup device to reduce the sensitivity thereof to a greater degree the higher the level of the extracted video signal.

As a consequence, the second image pickup device is capable of producing a non-saturated video signal corresponding to a higher-brightness portion of the object, thereby broadening the dynamic range of the television camera accordingly.

According to another aspect of the invention, there is provided a television camera comprising a lens system having a iris structure for receiving the incident light from an object, a spectrometer for dispersing the optical image of the object from the lens system and producing first and second optical images, the spectrometer dividing the light quantity of the optical image of the object from the lens system in a predetermined ratio and assigning the respective portions of the light quantity between the first and second optical images, first and second image pickup devices for forming first and second optical images from the spectrometer and converting the first and second optical images thus formed into a video signal, first and second amplifiers for amplifying the video signals from the first and second image pickup devices, a high-brightness signal (area) detection circuit supplied with a video signal from the first amplifier and producing a detection signal indicating a high-brightness signal (area) upon detection that the input video signal is a high-brightness signal (area) of more than a predetermined level lower than the saturated output signal level of the first image pickup device, first and second multipliers for multiplying the video signal from the first and second amplifiers by a predetermined coefficient respectively and outputting the product thereof, an adder for adding the video signals from the first and second multipliers to each other and producing the sum thereof, a signal processing circuit for converting the video signal from the adder into a composite video signal and producing the composite video signal as an output composite video signal of the television camera, a iris control circuit for controlling the iris structure of the lens system in accordance with the video signal from the first amplifier, a high-brightness video signal extraction circuit for gating the video signal from the second amplifier in accordance with the detection signal and extracting a video signal (or a portion of a video signal) corresponding to the high-brightness signal (area), and an image pickup device control circuit for controlling the charge storage time of the second image pickup device in accordance with the level of the video signal extracted from the high-brightness video signal extraction circuit.

Preferably, the coefficients of the first and second multipliers assume a positive value less than 1.0 respectively.

In the above-mentioned configuration, the charge storage time of the second image pickup device is controlled in accordance with the brightness of a high-brightness area of the extracted video signal, and therefore an image of good color reproducibility is obtained without any blackening or whitening even for an object having a high contrast. Further, the output video signals of the first and second multipliers are added to each other, so that the brightness of the output video signal of the television camera can be charged continuously with the light intensity of an object.

DESCRIPTION OF THE PREFERRED EMBODIMENTS

Figure 1:
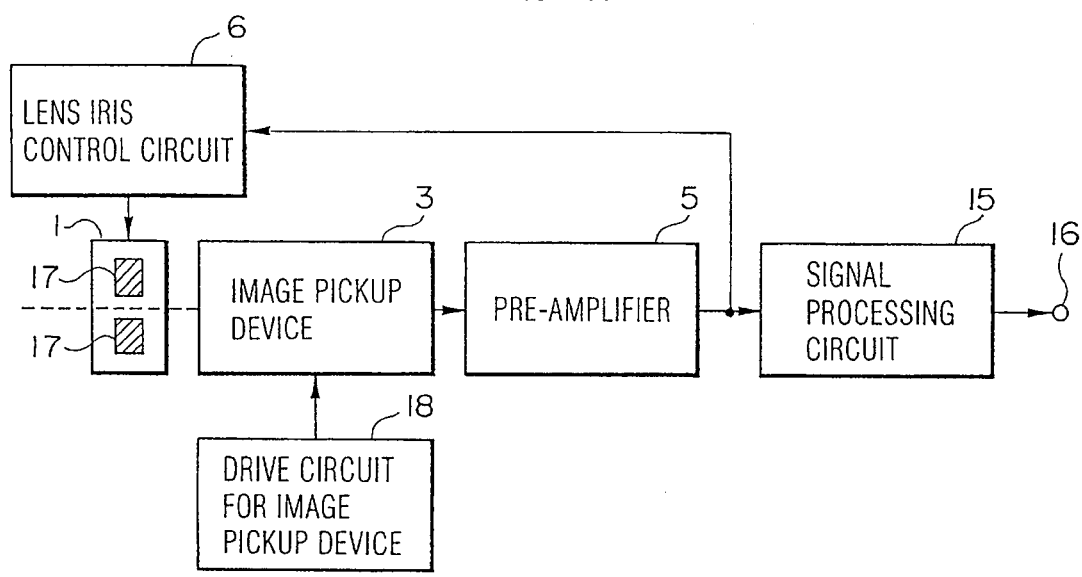
FIG. 1 is a circuit block diagram showing the configuration of an example television camera according to the prior art.
Figure 2:
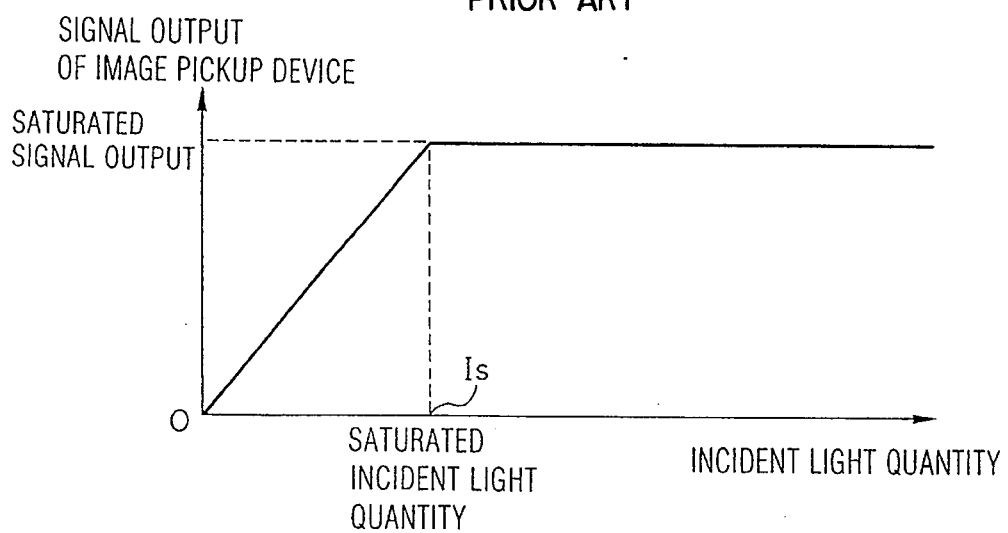
FIG. 2 is a diagram showing the characteristics of an image pickup device of a television camera shown in FIG. 1.
Figure 3:
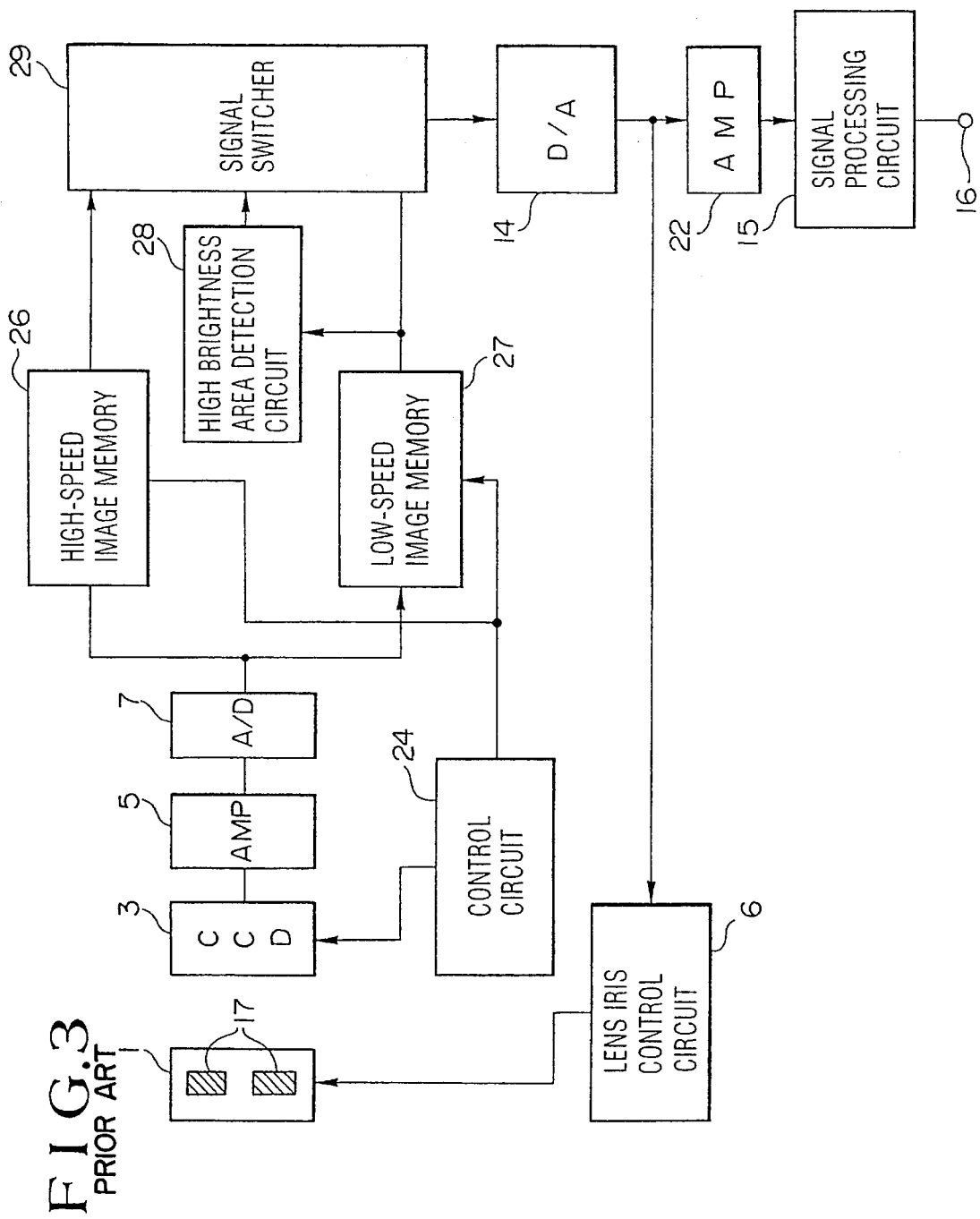
FIG. 3 is a circuit block diagram showing the configuration of another example television camera according to the prior art.
Figure 4A:
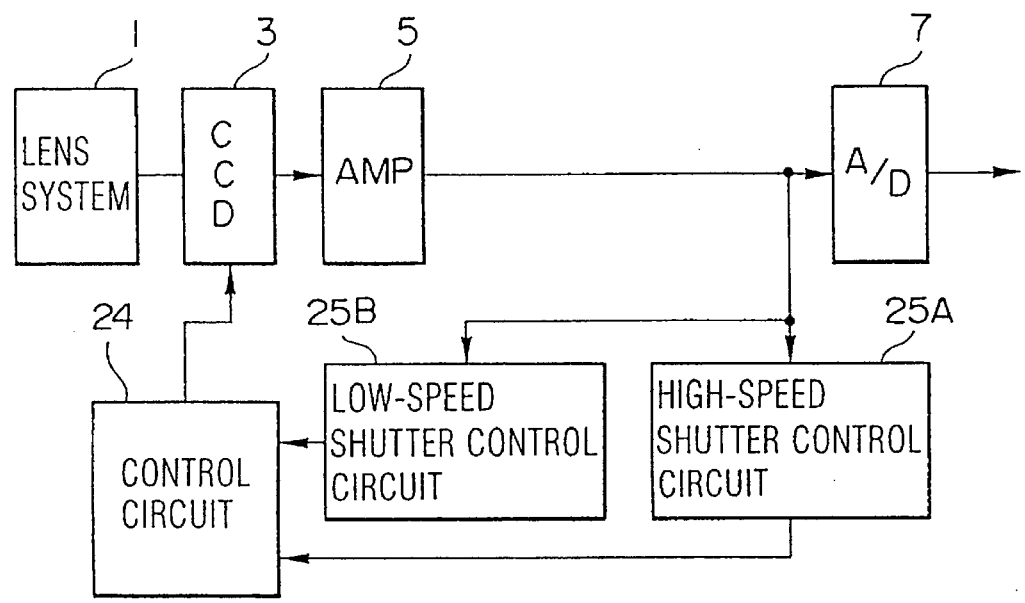
FIG. 4A is a circuit block diagram showing the configuration of a modification of the circuit shown in FIG. 3.
Figure 4B:
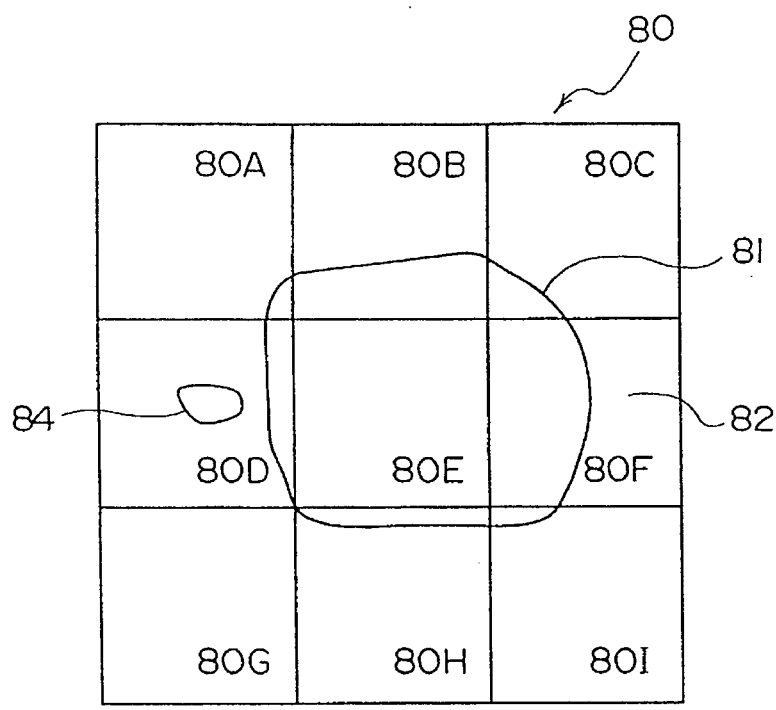
FIG. 4B is a diagram for explaining the operation of the circuit shown in FIGS. 3 and 4A.
Figure 5:
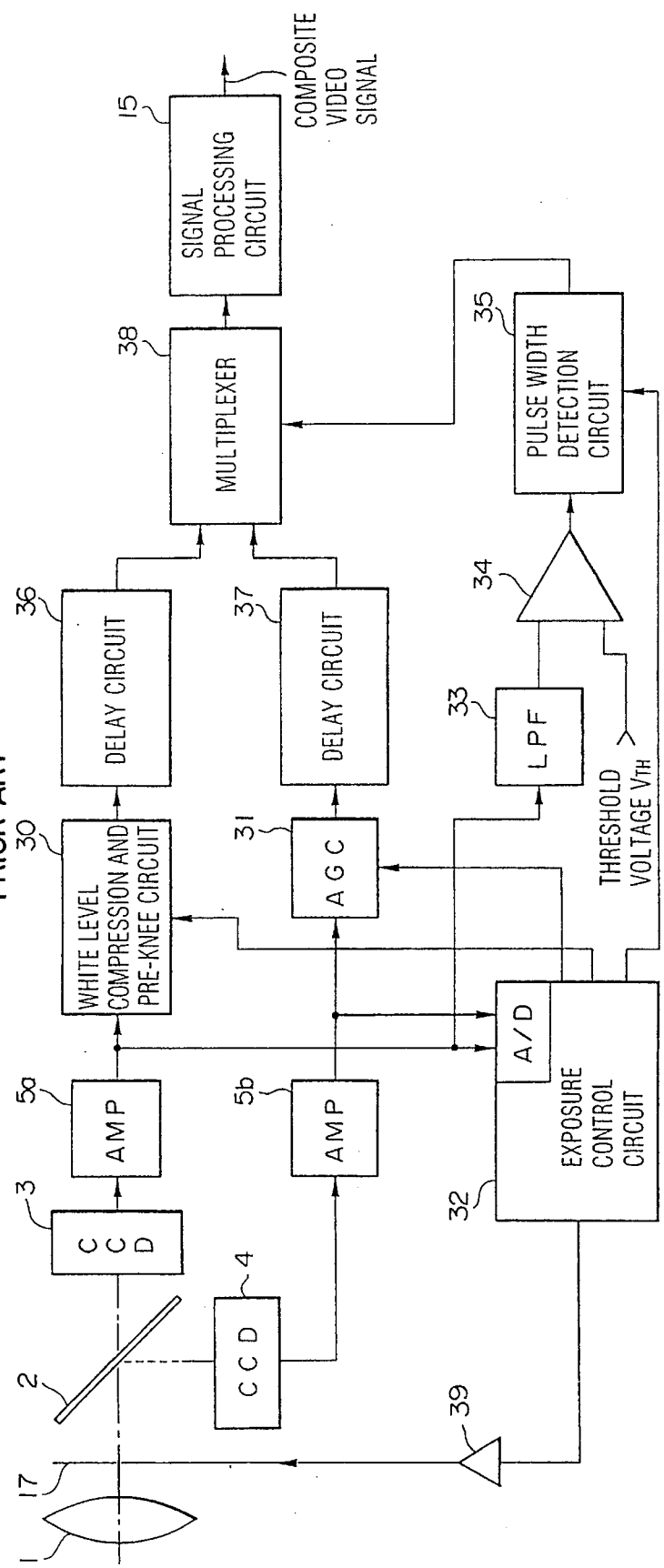
FIG. 5 is a circuit block diagram showing the configuration of still another example television camera according to the prior art.

Embodiments of the present invention will be explained in detail below with reference to the accompanying drawings. In each drawing, the component parts having the same functions are designated by the same reference numerals respectively and will not be described any more.

Figure 6:
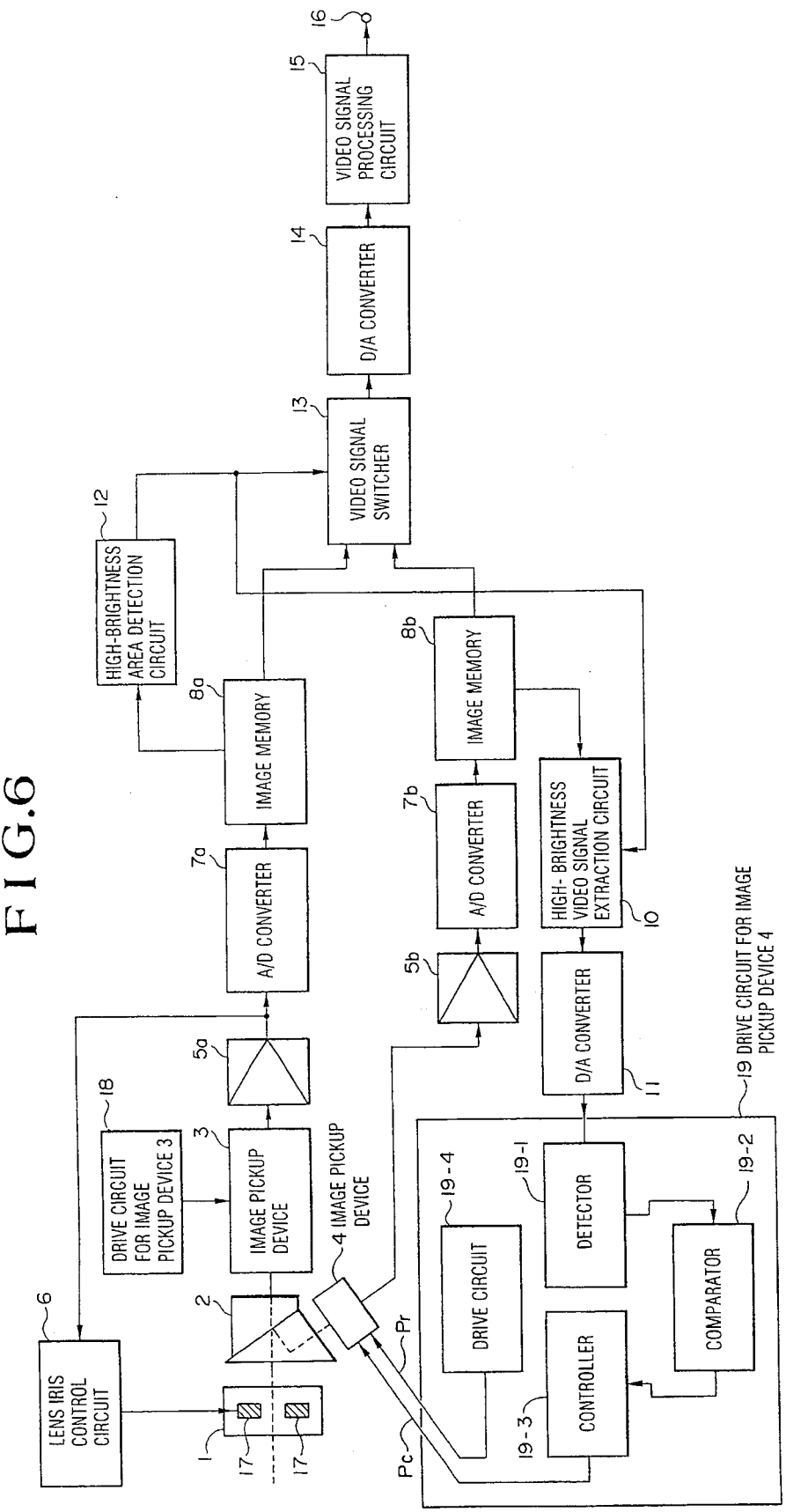
FIG. 6 is a circuit block diagram showing the configuration of a television camera according to a first embodiment of the invention.

FIG. 6 is a circuit block diagram showing the configuration of a television camera according to a first embodiment of the invention. This television camera comprises an imaging lens system 1, a spectrometer 2 including a prism or a half mirror, first and second image pickup devices 3, 4 such as CCDs, preamplifiers 5a, 5b, a lens iris control circuit 6, analog-to-digital (hereinafter referred to as "A/D") converters 7a, 7b, image memories 8a, 8b such as line memories, a high-brightness video signal extraction circuit 10 for extracting a signal within a high-brightness signal area of more than a predetermined level of the digital video signal read from the image memory 8b, a digital-to-analog (hereinafter referred to as "D/A") converter 11, a high-brightness area detection circuit 12 for producing a detection signal indicating whether or not a video signal from the image memory 8a represents a signal area (high-brightness area) of a brightness higher than a predetermined level, a video signal switcher 13 for selectively outputting any of the video signals read from the image memories 8a, 8b in response to a detection signal from the high-brightness area detection circuit 12, a D/A converter 14, a video signal processing circuit 15, a video signal output terminal 16, a iris structure 17 in the imaging lens system 1, a drive circuit 18 for the first image pickup device 3, and a drive circuit 19 for the second image pickup device 4.

Figure 7:
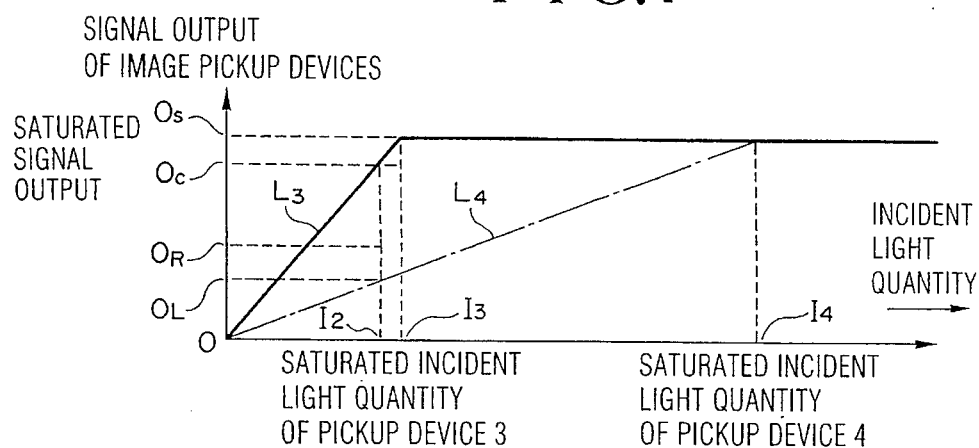
FIG. 7 is a diagram showing the photoelectric conversion characteristics of the two image pickup devices according to the embodiment of FIG. 6.

FIG. 7 is a photoelectric conversion characteristic diagram showing the characteristics of the signal output versus the incident light quantity of the image pickup devices 3, 4 in FIG. 6. In FIG. 7, the characteristic curve $L_3$ represents the characteristic of the first image pickup device 3, and the characteristic curve $L_4$ the characteristic of the second image pickup device 4. An incident light quantity $I_3$ represents an incident light quantity to the first image pickup device 3 at which the output video signal of the device 3 saturates, and an incident light quantity $I_4$ represents an incident light quantity to the image pickup device 4 at which the output video signal of the device 4 saturates these light quantities $I_3$ and $I_4$ hereinafter will be called as saturation or saturated light generaties. In this respect, the output video signals of the devices 3 and 4 will be kept saturated when incident light generaties thereto exceed the levels $I_3$ and $I_4$, respectively.

The drive circuit 19 described later thus differentiates the photoelectric conversion characteristics (gradients of the characteristic curves $L_3$, $L_4$) of the first and second image pickup devices 3, 4 respectively.

The predetermined level detected by the high-brightness area detection circuit 12 is the level $0_C$ in FIG. 7, which level $0_C$ is smaller than the saturated output level $0_S$ of the image pickup devices and larger than the rated output level $0_R$, or 90% of the saturated output level $0_S$, for example.

Also, the spectrometer 2 disperses the optical image of an object from the lens system 1 into first and second optical images which are applied to the first and second image pickup devices 3, 4, respectively. In the process, the light quantity of the optical image from the lens system 1 is split and applied to the image pickup devices 3, 4 in a predetermined ratio, or in the ratio of 1 to 1 in the present case.

The operation of the first embodiment shown in FIG. 6 will be explained. The incident light (optical image) from an object not shown is passed through the imaging lens system 1 and the spectrometer 2 to thereby be dispersed into a first optical image entering the first image pickup device 3 and a second optical image entering the second image pickup device 4.

The incident light proceeding straight to the spectrometer 2 forms an image on the first image pickup device 3, and is subjected to photoelectric conversion into a video signal at the first image pickup device 3 and then applied to a pre-amplifier 5a. The video signal is amplified to a predetermined level at the pre-amplifier 5a and applied to a lens iris control circuit 6 and an A/D converter 7a. The first image pickup device 3 is driven by a drive circuit 18 in such a manner as to perform photoelectric conversion in charge storage mode by field or by frame.

The lens iris control circuit 6 detects the average value or the peak value, for example, of the video signal applied from the pre-amplifier 5a, extracts the change in the average value or the peak value by comparing the detected peak value or the detected average value with a reference value, and maintains a predetermined value of the output video signal level of the pre-amplifier 5a in accordance with the change in the extracted peak value or the extracted average value of the video signal by controlling the aperture state of the iris structure 17 of the imaging lens system 1. The incident light entering the first and second image pickup devices 3 and 4 from the imaging lens system 1 are thus controlled.

On the other hand, the A/D converter 7a converts the video signal from the pre-amplifier 5a into a digital signal and applies the resultant digital signal to an image memory 8a such as a line memory. The image memory 8a may be a line memory for storing the video signal by one or two horizontal scan lines unit basis, for example. The image memory 8a thus sequentially and continuously stores the digital video signal input from the A/D converter 7a.

The digital video signal stored in the image memory 8a is read out one line or two later, and is applied to the high-brightness area detection circuit 12 and the video signal switcher 13.

The high-brightness area detection circuit 12 detects an area, i.e., a high-brightness signal area where the signal output of the first image pickup device 3 reaches or exceeds a predetermined level of $0_C$, and applies a detection signal (hereinafter referred to as "the high-brightness area signal") representing the high-brightness signal area to the high-brightness video signal extraction circuit 10 and the video signal switcher 13.

Figure 8:
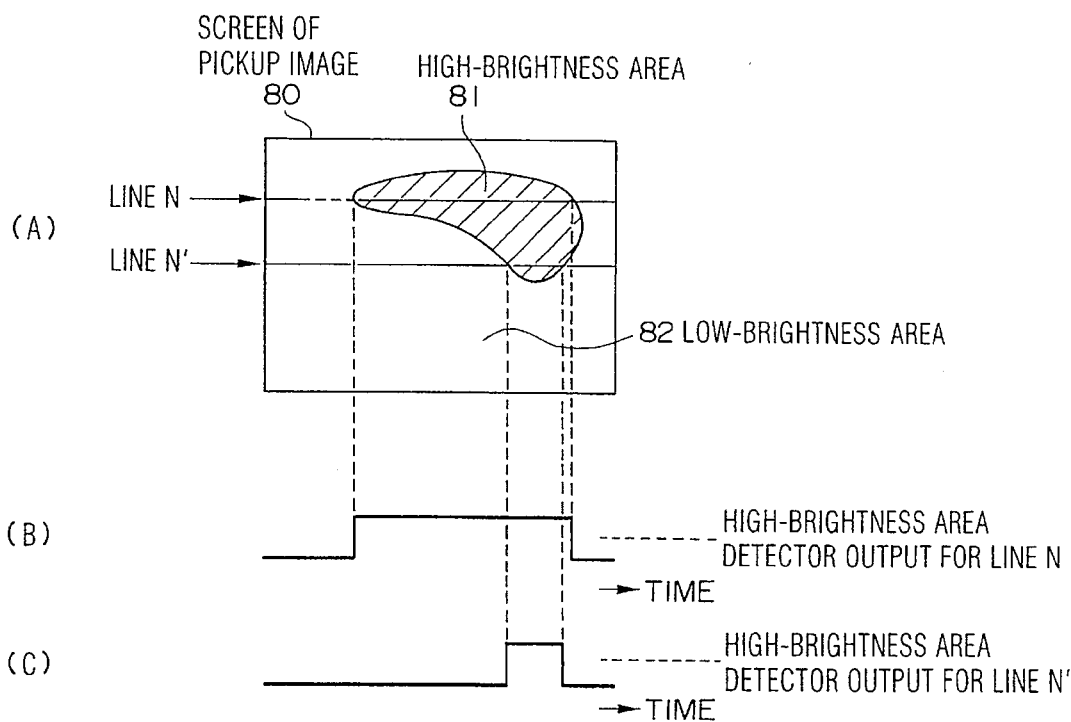
FIG. 8 is a diagram for explaining the operation of a high-brightness area detection circuit according to the embodiment shown in FIG. 6.

The operation of this high-brightness area detection circuit 12 will be explained with reference to FIG. 8. (A) of FIG. 8 is a model diagram showing one screen 80 of an image of an object image-picked up by the image pickup device. This image is assumed to include, for example, a high-brightness area 81 and a low-brightness area 82 for simplicity's sake. The high-brightness area 81 is an area where the output signal of the image pickup device 3 is equal to or higher than the predetermined level of $0_C$, and the low-brightness area 82 represents an area where the output signal of the image pickup device 3 is less than the predetermined level of $0_C$. As a result, upon receipt of a video signal from the image memory 8a corresponding to a horizontal scan line N of (A) of FIG. 8, for example, the high-brightness area detection circuit 12 produces a high-level signal such as shown in (B) of FIG. 8 during a period where the video signal level from the memory 8a is equal to or more than the predetermined level $0_C$. During a period where the level of the video signal from the memory 8a is less than $0_C$, in contrast, the high-brightness area detection circuit 12 produces a low-level signal. The high-brightness area detection circuit 12 thus produces a high-brightness area signal in such a form that the portion thereof corresponding to the high-brightness area 81 is at a high level and the portion corresponding to the low-brightness area 82 is at a low level. In a similar fashion, upon receipt of a video signal from the image memory 8a corresponding to a horizontal scan line N', the high-brightness area detection circuit 12 produces a high-brightness area signal as shown in (C) of FIG. 8.

The other incident light that has been reflected and dispersed on the spectrometer 2 and focused on the second image pickup device 4 is subjected to photoelectric conversion by the second image pickup device 4 into a video signal, which video signal is applied to a pre-amplifier 5b. The video signal is amplified to a predetermined level at the pre-amplifier 5b and applied to an A/D converter 7b.

The A/D converter 7b converts the video signal input thereto from the pre-amplifier 5b into a digital video signal and applies the same digital video signal to an image memory 8b such as a line memory. The image memory 8b may be a line memory for storing the video signal by one or two horizontal line unit basis, for example. This image memory 8b stores the digital video signal input from the A/D converter 7b sequentially and continuously.

The digital video signal stored in the image memory 8b is read out for each line with a delay of one or two lines and applied to the high-brightness video signal extraction circuit 10 and the video signal switcher 13.

The other input to the high-brightness video signal extraction circuit 10 is supplied with a high-brightness area signal detected at the high-brightness area detection circuit 12 as mentioned above.

The high-brightness video signal extraction circuit 10 extracts a digital video signal representing the high-brightness area from among the digital video signals read out of the image memory 8b in accordance with the high-brightness area signal serving as a gate signal, and applies the extracted digital video signal to the D/A converter 11.

More specifically, the extraction circuit 10 is adapted to pass the video signal read from the image memory 8b only during the period of high level of the high-brightness area signal. The video signal extracted from the extraction circuit 10 thus is comprised of only the high-brightness area 81 shown in (A) of FIG. 8.

The D/A converter 11 converts the digital video signal corresponding to the high-brightness area extracted by the high-brightness video signal extraction circuit 10 into an analog video signal and applies the analog video signal to the drive circuit 19 for the second image pickup device 4.

The drive circuit 19 includes a driver 19-4 for applying a read pulse PR for reading the stored electric charge of the second image pickup device 4 at every field, a detector 19-1 for detecting, at every field or frame of the video signal, the peak value or the average value of the video signal corresponding to the high-brightness area applied from the high-brightness video signal extraction circuit 10 through the D/A converter 11, a comparator 19-2 for comparing the detected average value or the detected peak value with a reference value (less than the saturated value) set in the drive circuit 19 to detect change in the average value or the change in the peak value as a result of the comparison, and a controller 19-3 for controlling the period of generating of the charge release pulse PC (electronic shutter pulse) for controlling the storage time of the second image pickup device 4. The charge release pulse with the period of generation controlled is applied to the second image pickup device 4, so that the charge storage time of the second image pickup device 4 is controlled in such a manner that the video signal for the portion corresponding to the high-brightness area is not saturated.

As a result, the drive circuit 19 causes the second image pickup device 4 to operate or function as an electronic shutter.

Figure 9:
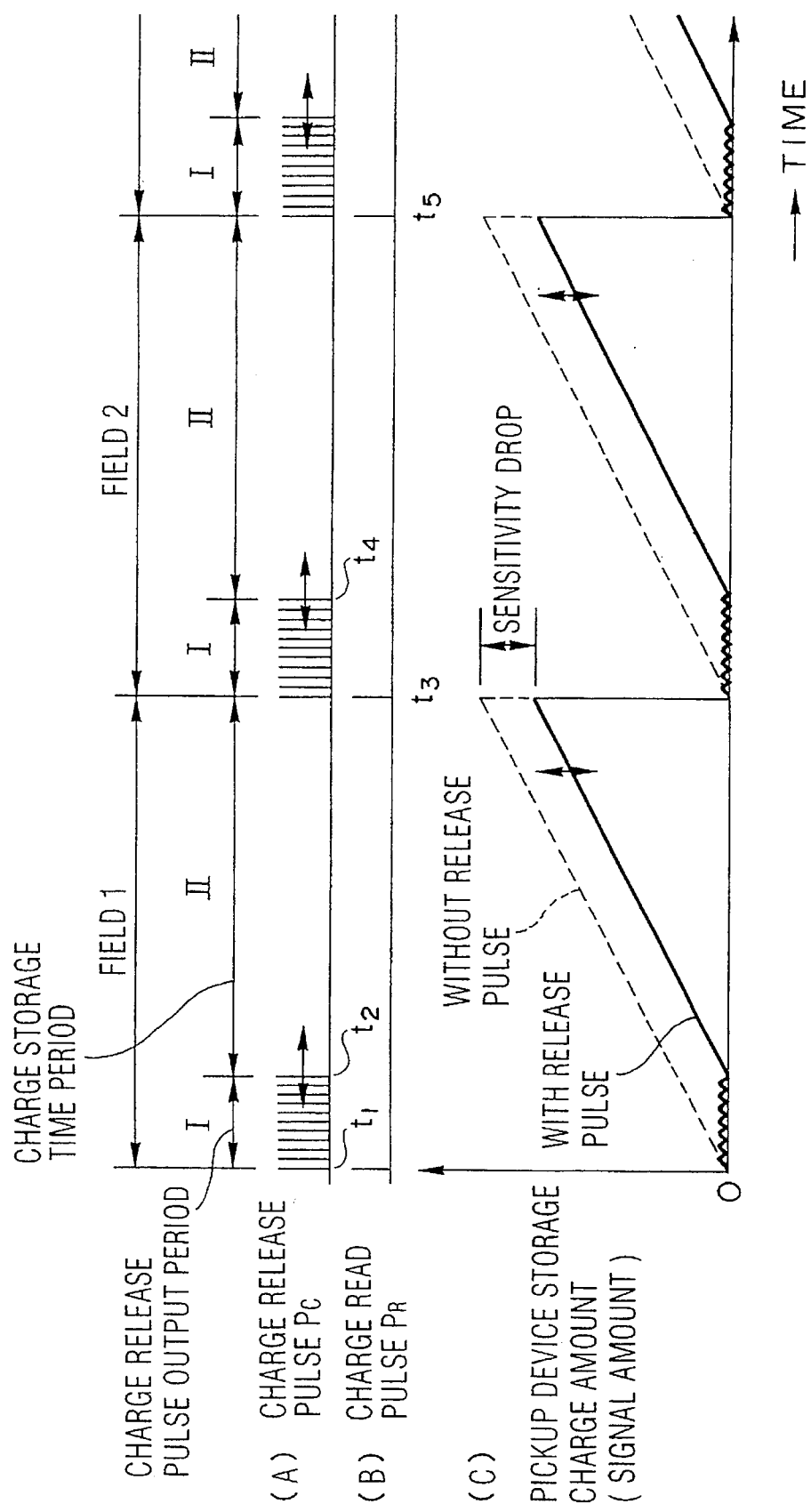
FIG. 9 is a timing chart for explaining the operation of a drive circuit for the image pickup devices according to the embodiment shown in FIG. 6.

Now, the control operation of the controller 19-3 in the drive circuit 19 for the second image pickup device 4 will be explained with reference to the timing chart of FIG. 9. FIG. 9 shows the relationship between the output timing of the charge release pulse and the storage charge amount of the image pickup device 4. In the example shown in FIG. 9, before the beginning of the first field, for example, a charge read pulse $P_R$ ((B) of FIG. 9) is applied from the drive circuit 19 to the second image pickup device 4 at a time point t1 and the storage charge accumulated in the image pickup device 4 is read out. After that, the charge release pulses PC ((A) of FIG. 9) are intermittently output with a given period until time point t2. During this period (charge release pulse period from time point t1 to t2), therefore, the storage charge of the image pickup device 4 ((C) of FIG. 9) is zero. When the charge release pulse ceases to be output thereafter, the storage charge amount of the image pickup device 4 gradually increases as shown by the solid line in (C) of FIG. 9. The dotted line in (C) of FIG. 9 shows the case in which the charge release pulse is not output at all during each field. The difference in storage charge between the solid line and the dotted line thus represents the sensitivity difference of the image pickup device. The more the timing is delayed when the charge release pulse ceases to be output (the output is stopped) in each field, and hence the more the charge storage time is shortened (the smaller the storage charge amount), the lower the sensitivity of the image pickup device can be set.

In this way, the charge storage time of the second image pickup device 4 is controlled in accordance with the change in the peak value or the average value of the video signal for the high-brightness area extracted by the high-brightness signal extraction circuit 10, so that as shown in FIG. 7, the gradient of the characteristic curve L4 of the second image pickup device 4 is reduced as compared with the gradient of the characteristic curve L3 of the first image pickup device 3. In other words, the photoelectric conversion coefficient or the sensitivity of the second image pickup device 4 is reduced as compared with that of the first image pickup device 3. Thus, the saturation incident light quantity of the image pickup device 4 is made larger than that of the image pickup device 3.

As explained above, the drive circuit 19 includes, in addition to the driver 19-4 for the second image pickup device 4, the controller 19-3 for controlling the charge storage time of the second image pickup device 4, whereby an unsaturated video signal output for the portion corresponding to a high-brightness area is produced from the second image pickup device 4. The charge storage time of the image pickup device 4 is controlled by the drive circuit 19 in such a manner that the video signal within the high-brightness area becomes equal to or below a predetermined level. As a result, a high-brightness the high-brightness portion of the output video signal of the image pickup device 4 is kept in the optimum image level without being saturated. This charge storage time control means is not limited to the one built in the drive circuit 19 but may be provided independent thereof.

Now, the video signal switcher 13 will be explained. The switcher 13 selectively outputs a digital video signal from the image memory 8a during the period when the high-brightness area signal from the high-brightness area detection circuit 12 is at a low level, while a digital video signal from the image memory 8b is selected and output during the period when the high-brightness area signal is at a high level.

More specifically, during the period when the high-brightness area signal from the high-brightness area detection circuit 12 is at a low level (associated with the portion of the low-brightness area 82), the video signal switcher 13 selects the output of the image memory 8a, i.e., a video signal from the first image pickup device 3 that is a digital video signal with the image of a low-illuminance object not solidly blackened. During the period when the high-brightness area signal from the high-brightness area detection circuit 12 is at a high level (associated with the portion of the high-brightness area 81), on the other hand, the video signal switcher 13 selects the output from the image memory 8b, i.e., a video signal from the second image pickup device 4 that is a digital video signal with the high-illuminance object not saturated (not solidly whitened). The video signals from the image pickup devices 4, 3 are selected respectively as non-saturated video signals of proper level for the high-brightness area 81 and the low-brightness area 82. Thus, the digital video signals selected by the video signal switcher 13 is at the non-saturated and proper level for an object of low- to high-illuminance and the video signal selected by the video signal switcher 13 is converted from a digital video signal into an analog video signal by the D/A converter 14. The signal processing circuit 15 receives various signals from a sync signal generator (not shown) to process the analog video signal by adding a sync signal and a pedestal etc., thereby generating a composite video signal which is then output from a video signal output terminal 16.

As described above, according to this embodiment, the spectrometer for dispersing the incident light from an object and the two image pickup devices are employed in a manner that the charge storage time of one of the two image pickup devices is controlled in accordance with the brightness of the incident light to thereby increase the saturation incident light quantity thereof, and further one of the video signal outputs from the two image pickup devices are selected in accordance with the video signal level from the image pickup device, i.e., the brightness of the incident light. As a result, in the case of imaging an object with a large contrast or imaging such an object in back light environment, even if the object has a portion of very high brightness, an image high in color reproducibility without solid blackening or solid whitening can be obtained regardless of high or low illuminance of the object.

In the first embodiment, as described above, one of the outputs of the image memories 8a and 8b is selected in accordance with a level of the high-brightness area signal. As shown in FIG. 7, when an incident light quantity entered into the image pickup device 3 exceeds the value 12 and an output video signal level thereof exceeds the level $0_C$, the output of the image memory 8b (the output of the image pickup device 4 corresponding to the characteristic curve $L_4$) is selected instead of the output of the image memory 8a (the output of the image pickup device 3 corresponding to the characteristic curve 13). However, when the incident light quantity is 12, the output video signal levels of the image pickup devices 3 and 4 become $0_C$ and $0_L$, respectively, which differ greatly to each other. When an object whose illuminance or brightness differs continuously over the area thereof is image-picked up, the signal switcher 13 changes its output from the output of the image memory 8a to that of the image memory 8b or vice versa when an incident light quantity from the object changes across the level 12. In this case, level of the output video signal of the switcher 13 changes greatly, and so the output video signal level of the camera becomes incontinuous even though the illuminance or brightness of the object changes continuously over the area thereof. In other word, despite that the illuminance or brightness of the object changes continuously over the area thereof, the output video signal level of the camera changes greatly and incontinuously, whereby the output video image seems as if brightness or illuminance of the object incontinuously changes or differs at the point of the incident light quantity of 12.

Figure 10:
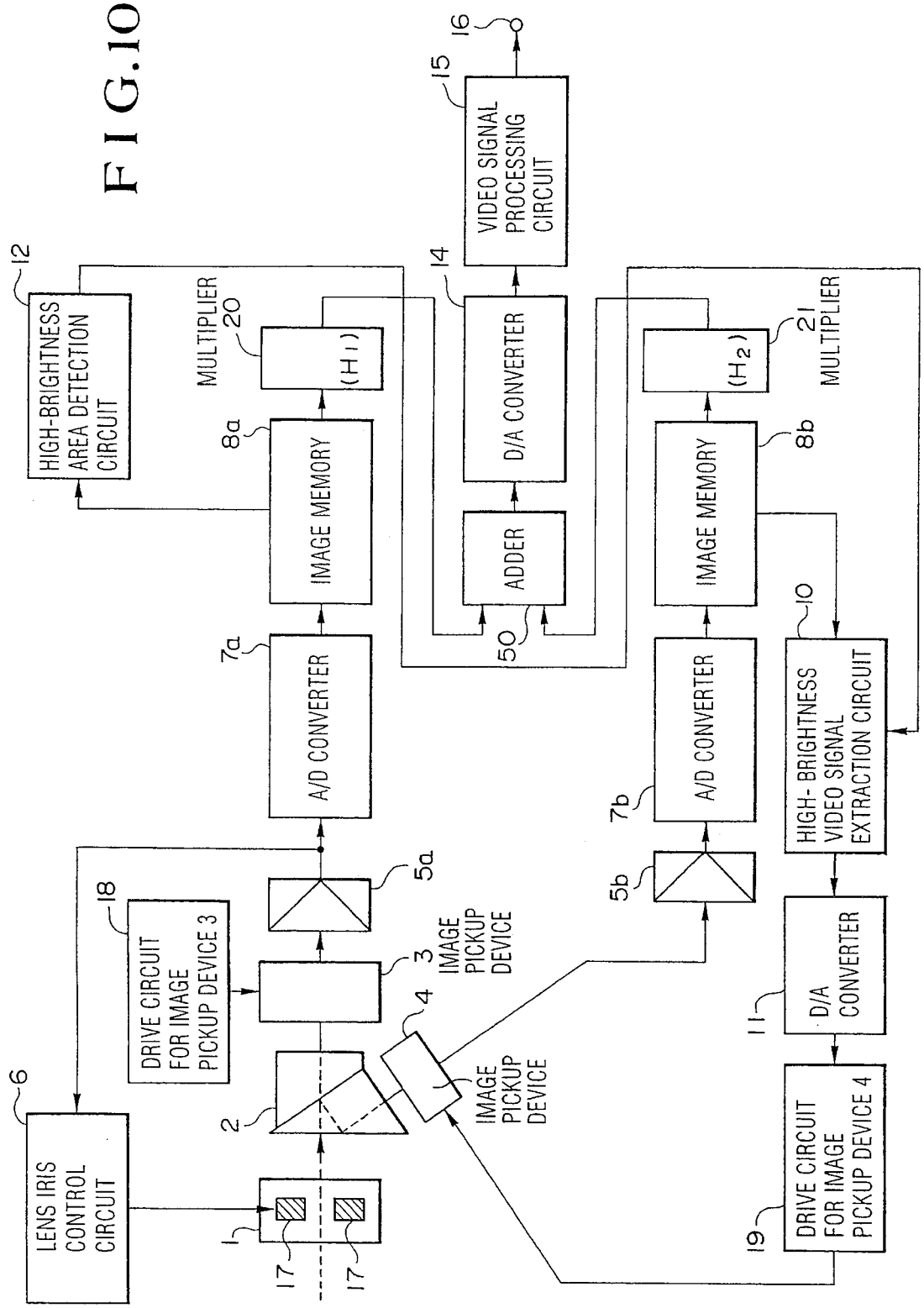
FIG. 10 is a circuit block diagram showing the configuration of a television camera according to a second embodiment of the invention.

FIG. 10 is a block diagram showing a second embodiment of the invention. In view of the aforesaid fact of the first embodiment, according to this embodiment, multipliers 20, 21 are provided between the image memories 8a, 8b and the switcher 13 respectively, and an adder 50 is provided instead of the switcher 13 in the first embodiment. In other words, this embodiment is not constituted in a manner that one of the outputs of the image memories, 8a and 8b are selected in accoreance with the level of the high-brightness area signal like the first embodiment. This embodiment is configured in a manner that the output video signal of the first image pickup device 3 and the output video signal of the second image pickup device 4 are multiplied by predetermined coefficients, respectively, then the resulting products are added to each other and output, with the intention of producing no blackened or whitened portion as to the object with high- to low-brightness and continuously less significant) the brightness difference between the changing or differentiating the output video signal level of the television camera in accordance with the brightness or illuminance of the object.

In FIG. 10, the digital video signal read from the image memories 8a and 8b are applied to the multipliers 20 and 21 respectively. The multipliers 20 and 21 multiply the input digital video signals by predetermined coefficients M1 and M2 (M1 and M2 are positive values less than 1.0, for example, M1=M2=0.5), respectively, and apply the resultant multiplied values to the adder 50.

The coefficients M1, M2 may be any positive values of less than 1.0 and may be different from each other but preferably such positive values satisfying a condition of M1+M2=1.0. The adder 50 adds the video signals from the multipliers 20 and 21 and applies the resultant sum to the D/A converter 14. The operation of the other parts of the circuit configuration of FIG. 10 is same as that of the first embodiment.

Figure 11:
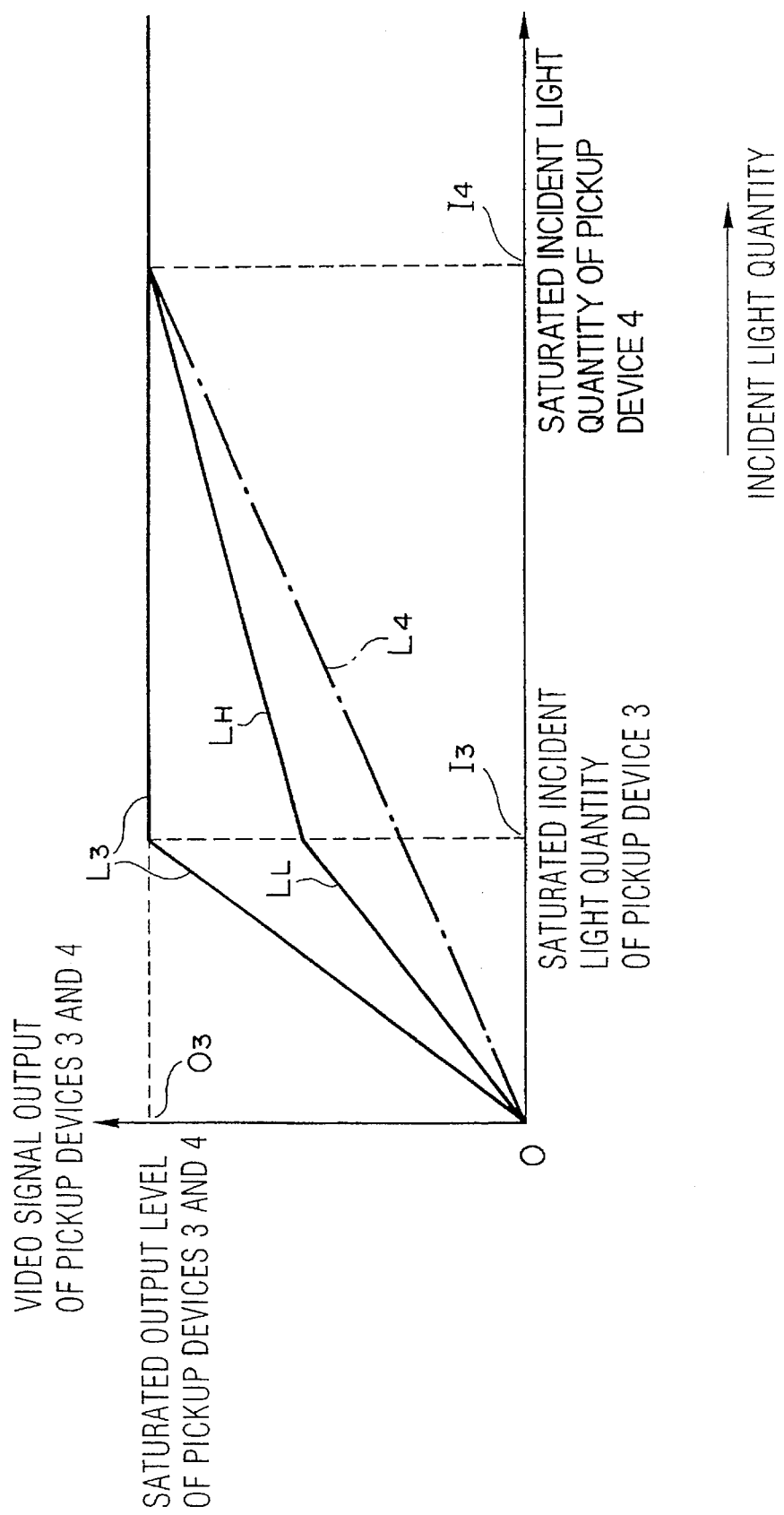
FIG. 11 is a diagram showing the photoelectric conversion characteristics of the two image pickup devices according to the embodiment shown in FIG. 10.

FIG. 11 is an input-output characteristic diagram showing the characteristics of the video signal output (at the video signal output terminal 16) and the incident light quantity from an object according to the second embodiment shown in FIG. 10. In the characteristic diagram of FIG. 11, each of the coefficients M1, M2 is set to be 0.5.

The video signals produced from the first and second image pickup devices 3, 4 are processed at the amplifiers 5a, 5b and the image memories 8a, 8b and then are multiplied by the predetermined coefficients M1, M2 at the multipliers 20, 21 respectively, with the products thereof added to each other at the adder 50.

Accordingly, the multiplied and summed output video signal level from the television camera has such characteristics as shown in FIG. 11 that the output video signal level increases along a characteristic curve $L_L$ with the increase of the incident light quantity until the incident light quantity reaches the saturation incident light quantity I3 at which the output level of the image pickup device 3 saturates, and also increases along a characteristic curve $L_H$ with the increase of the incident light quantity until the incident light quantity increases from the incident light quantity I3 to the incident light quantity I4 at which the output level of the image pickup device 4 saturates. Accordingly, an object image having no blackened or whitened portion can be obtained for the object with low-brightness to high-brightness corresponding to the incident light quantity I4. Further, even when an object whose illuminance changes or differs continuously over the area thereof is image-picked up, a composite video signal level also changes or differs continuously with the change in the illuminance of the object, thereby eliminating incontinuous point of brightness appeared in the first embodiment from an image of the composite video signal.

As described above, according to the second embodiment, the charge storage time of the second image pickup device 4 is controlled by the drive circuit 19 in accordance with the brightness of the high-brightness area 81, and therefore as in the first embodiment, an image of good color reproducibility without any solid blackening or solid whitening can be obtained even for an object high in contrast. Further, since the composite video signal is obtained from the summed output video signals of the multipliers 20, 21, the output video signal level of the television camera can be made continuously change with the illumination of an object.

According to the aforementioned embodiments, the ratio in which the light quantity is split at the spectrometer 2 into the first and second optical images is set to 1 to 1. However, any ratio other than 1 to 1, for example, a ratio ranging from 1:2 to 1:9 may alternatively be employed. In that case, the gradient of the characteristic curve L4 of the second image pickup device 4 can be reduced as compared with that of the characteristic curve L3 of the first image pickup device 3 without controlling the charge storage time of the image pickup device 4 by the drive circuit 19. This also makes it possible to increase the saturated incident light quantity I4 as compared with the saturated incident light quantity I3 of the first image pickup device 3. As a result, in addition to the changing of the ratio to one other than 1 to 1, by controlling the charge storage time of the second image pickup device 4 by the drive circuit 19, the dynamic rage against the incident light quantity of the television camera can be further increased.

I claim:

1. A television camera comprising:

a lens system having an iris structure for receiving incident light from an object;

a spectrometer for dispersing an optical image of said object from said lens system and producing first and second optical images, said spectrometer splitting light quantity of the optical image of said object from said, lens system and assigning the split light quantities to said first and second optical images in a predetermined ratio;

first and second image pickup devices, on which the first and second optical images from said spectrometer are focused, for converting said first and second optical images into video signals, respectively;

first and second amplifiers for amplifying the video signals from said first and second image pickup devices, respectively;

a high-brightness signal detection circuit for detecting whether or not the video signal supplied from said first amplifier is a high-brightness signal indicating that said video signal from said first amplifier has a level equal to or higher than a predetermined level which is lower than a saturated output signal level of said first image pickup device, and for outputting a detection signal indicating the high-brightness signal during a period where the video signal from said first amplifier is detected to have a level equal to or higher than said predetermined level;

a video signal switcher for selecting and outputting one of said video signals from said first and second amplifiers in accordance with said detection signal;

a signal processing circuit for converting the video signal from said video signal switcher into a composite video signal and outputting said composite video signal as an output composite video signal of said television camera;

an iris control circuit for controlling an opening of said iris structure of said lens system in accordance with the video signal from said first amplifier;

a high-brightness video signal extraction circuit for gating the video signal from said second amplifier in accordance with said detection signal and extracting the gated video signal of said video signal from said second amplifier corresponding to said high-brightness signal out of the video signal output from said second amplifier; and an image pickup device control circuit for controlling a charge storage time of said second image pickup device in accordance with a level of the video signal extracted by said high-brightness video signal extraction circuit.

2. A television camera according to claim 1, wherein said video signal switcher selectively outputs the video signal from said second amplifier during a period when the detection signal indicates that the video signal from said first amplifier is a high-brightness signal.

3. A television camera according to claim 1, wherein said predetermined level is higher than a rated output signal level of said first image pickup device and lower than said saturated output signal level.

4. A television camera according to claim 1, wherein said spectrometer assigns the light quantity of the optical image of said object from said lens system to said first and second optical images in a ratio of 1 to 1 as said predetermined ratio.

5. A television camera according to claim 1, wherein said spectrometer assigns the light quantity of said optical image of said object from said lens system to said first and second optical images in a ratio ranging from 1:2 to 1:9 as said predetermined ratio.

6. A television camera according to claim 1, wherein an incident light quantity to said second image pickup device when the output signal of said second image pickup device reaches a saturation level thereof is larger than an incident light quantity to said first image pickup device when the output signal of said first image pickup device reaches a saturation level thereof.

7. A television camera according to claim 1, wherein said image pickup device control circuit shortens a charge storage time of said second image pickup device more, the higher a level of the video signal extracted by said high-brightness video signal extraction circuit.

8. A television camera according to claim 1, wherein said image pickup device control circuit reduces a sensitivity of said second image pickup device to a greater degree by controlling a charge storage time of said second image pickup device, the higher a level of the video signal extracted by said high-brightness video signal extraction circuit.

9. A television camera according to claim 1, wherein said image pickup device control circuit controls a charge storage time of said second image pickup device on the basis of one of an average value and a peak value for one of each field and each frame of the video signal extracted by said high-brightness video signal extraction circuit.

10. A television camera comprising:

a lens system having an iris structure for receiving incident light from an object;

a spectrometer for splitting the optical image of said object from said lens system and producing first and second optical images, said spectrometer assigning light quantity of the optical image of said object from said lens system between said first and second optical images in a predetermined ratio;

first and second image pickup devices, on which the first and second optical images from said spectrometer are focused, for converting the first and second optical images thus formed into video signals, respectively;

first and second amplifiers for amplifying the video signals from said first and second image pickup devices, respectively;

a high-brightness signal detection circuit for detecting whether or not the video signal supplied from said first amplifier is a high-brightness signal indicating that said video signal from said first amplifier has a level equal to or higher than a predetermined level which is lower than a saturated output signal level of said first image pickup device, and for outputting a detection signal indicating the high-brightness signal during a period where the video signal from said first amplifier is detected to have a level equal to or higher than said predetermined level;

first and second multipliers for multiplying the video signals from said first and second amplifiers by predetermined coefficients M1, M2 and outputting respective products respectively;

an adder for adding the video signals from said first and second multipliers and outputting a sum thereof;

a signal processing circuit for converting the video signal from said adder into a composite video signal and outputting said composite video signal as an output composite video signal of said television camera;

an iris control circuit for controlling an opening of said iris structure of said lens system in accordance with the video signal from said first amplifier;

a high-brightness video signal extraction circuit for gating the video signal from said second amplifier in accordance with said detection signal and extracting the gated video signal of said video signal from said second amplifier corresponding to said high-brightness signal out of the video signal output from said second amplifier; and an image pickup device control circuit for controlling a charge storage time of said second image pickup device in accordance with a level of the video signal extracted by said high-brightness video signal extraction circuit.

11. A television camera according to claim 10, wherein said predetermined level is higher than a rated output signal level of said first image pickup device and lower than said saturated output signal level.

12. A television camera according to claim 10, wherein said spectrometer assigns the light quantity of the optical image of said object from said lens system to said first and second optical images in a ratio of 1 to 1 as said predetermined ratio.

13. A television camera according to claim 10, wherein said spectrometer assigns the light quantity of the optical image of said object from said lens system to said first and second optical images in a ratio ranging from 1:1 to 1:9 as said predetermined ratio.

14. A television camera according to claim 10, wherein said image pickup device control circuit shortens a charge storage time of said second image pickup device to a greater degree, the higher a level of the video signal extracted by said high-brightness video signal extraction circuit.

15. A television camera according to claim 10, wherein said image pickup device control circuit reduces a sensitivity of said second image pickup device to a greater degree by controlling a charge storage time of said second image pickup device, the higher a level of the video signal extracted by said high-brightness video signal extraction circuit.

16. A television camera according to claim 10, wherein each of the coefficients M1, M2 of said first and second multipliers is a positive value less than 1.0.

17. A television camera according to claim 10, wherein said image pickup device control circuit controls the charge storage time of said second image pickup device on the basis of one of a average value and a peak value for one of each field and each frame of the video signal extracted by said high-brightness video signal extraction circuit.

* * * * *